United States Patent [19]

Green et al.

[11] Patent Number: 4,524,951
[45] Date of Patent: Jun. 25, 1985

[54] CENTER-POSITION BIASED SLIDE VALVE

[75] Inventors: Charles J. Green, Vashon; Alan K. Forsythe, Burton, both of Wash.

[73] Assignee: GT Development Corporation, Tukwila, Wash.

[21] Appl. No.: 273,664

[22] Filed: Jun. 15, 1981

[51] Int. Cl.³ .................... F15B 13/04; F16K 3/02
[52] U.S. Cl. .................... 251/327; 137/625.25; 137/625.68; 251/86; 251/322
[58] Field of Search ............ 137/625.25, 625.68; 251/86, 327, 322

[56] References Cited

U.S. PATENT DOCUMENTS

| | | | |
|---|---|---|---|
| 2,094,926 | 10/1937 | Nutter et al. | 251/76 |
| 2,200,396 | 5/1940 | Martin | 250/33 |
| 2,394,487 | 2/1946 | Rotter et al. | 277/46 |
| 2,485,504 | 10/1949 | Morgan | 251/76 |
| 2,531,511 | 11/1950 | Hill . | |
| 2,594,664 | 4/1952 | Livers et al. . | |
| 2,796,230 | 6/1957 | Grove et al. | 251/172 |
| 2,822,823 | 2/1958 | Klein et al. | 137/625.21 |
| 2,858,851 | 11/1958 | Holl | 137/625.18 |
| 2,859,031 | 11/1958 | Hansen et al. | 267/1 |
| 2,868,497 | 1/1959 | Graham | 251/172 |
| 2,979,080 | 4/1961 | Hewitt . | |
| 2,998,828 | 9/1961 | Hare | 137/625.25 |
| 3,028,880 | 4/1962 | Reitman . | |
| 3,070,960 | 1/1963 | Ternent . | |
| 3,095,004 | 6/1963 | Jackson, Jr. et al. | 137/246.11 |
| 3,150,517 | 9/1964 | Kuffer et al. | 73/23.1 |
| 3,285,281 | 11/1966 | Pribonic et al. | 137/596 |
| 3,324,888 | 6/1967 | Henderson | 137/625.68 |
| 3,356,334 | 12/1967 | Scaramucci | 251/327 X |
| 3,432,141 | 3/1969 | Irti et al. | 251/172 |
| 3,763,891 | 10/1973 | Stiltner | 137/625.18 |
| 3,776,276 | 12/1973 | Stiltner | 137/625.18 |
| 4,340,203 | 7/1982 | Donner | 137/625.25 X |

Primary Examiner—Gerald A. Michalsky
Attorney, Agent, or Firm—Delbert J. Barnard; Joan H. Pauly

[57] ABSTRACT

A housing 10, 12 includes a slide chamber 14 in which a slide bar 30 reciprocates between three positions. A coil spring 60 is carried by the bar and extends into lower and upper recesses 50, 52 in the housing. When the bar is reciprocated from the intermediate position to either of the other positions, the ends of the recesses 54 compress the spring, thereby biasing the bar into the intermediate position.

22 Claims, 6 Drawing Figures

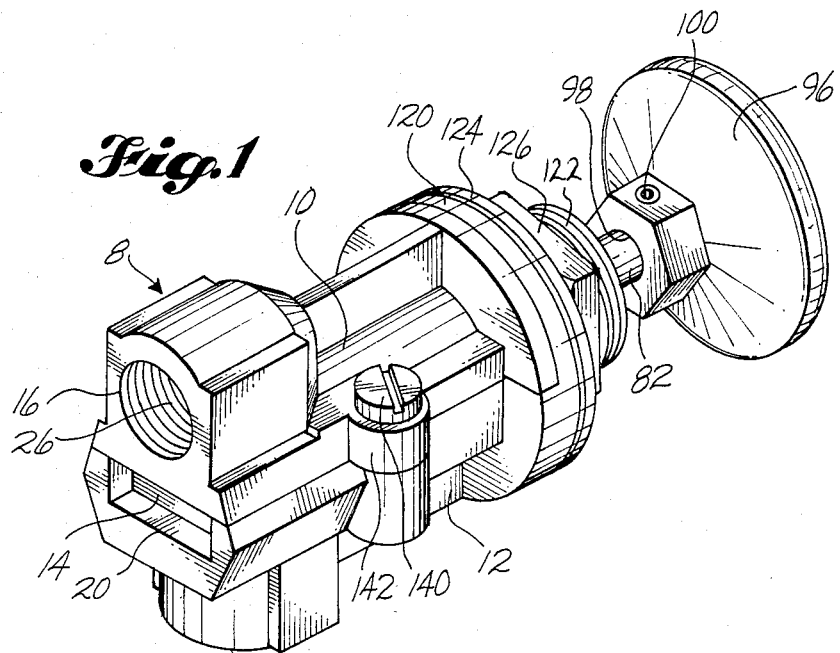
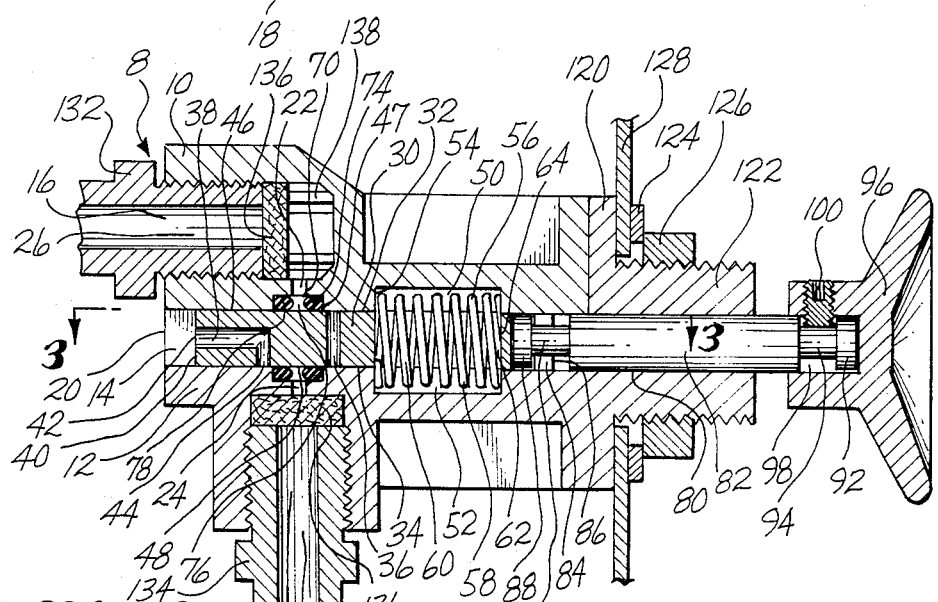

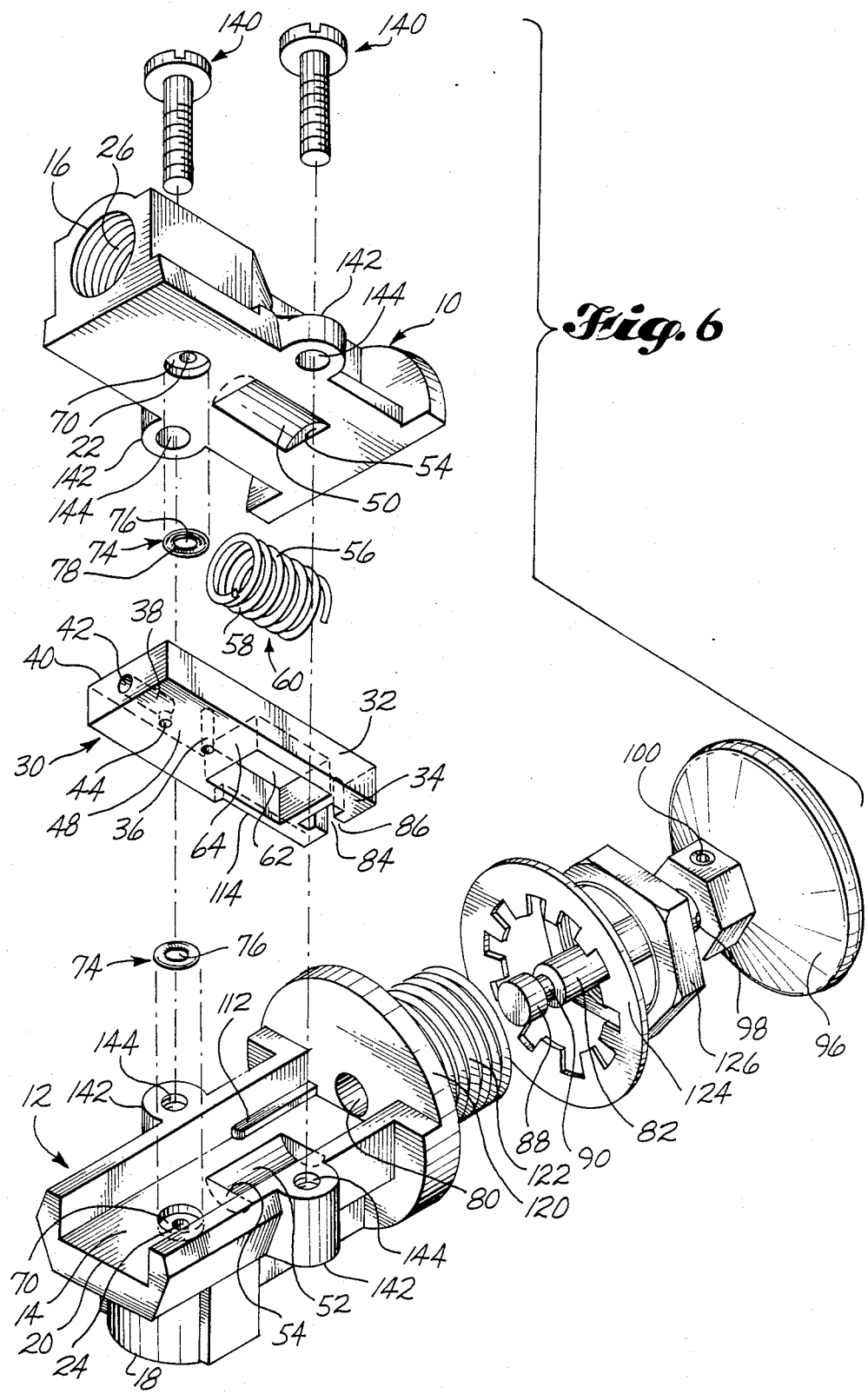

CENTER-POSITION BIASED SLIDE VALVE

TECHNICAL FIELD

This invention relates to multi-position valves and, more particularly, to a valve with a reciprocating slide bar that is biased by spring means into an intermediate position.

BACKGROUND ART

Multi-position valves with reciprocating slide bars, or gates, are quite old in the art. Such valves are described in U.S. Pat. No. 2,394,487, granted Feb. 5, 1946, to L. C. Rotter et al; U.S. Pat. No. 2,485,504, granted Oct. 18, 1949, to M. Morgan; U.S. Pat. No. 2,858,851, granted Nov. 4, 1958, to J. W. F. Holl; U.S. Pat. No. 2,868,497, granted Jan. 13, 1959, to C. P. Graham; U.S. Pat. No. 2,998,828, granted Sept. 5, 1961, to R. C. Hare; U.S. Pat. No. 3,070,960, granted Jan. 1, 1963, to G. E. Ternent; U.S. Pat. No. 3,095,004, granted June 25, 1963, to J. G. Jackson, Jr., et al; U.S. Pat. No. 3,150,517, granted Sept. 29, 1964, to F. B. Kuffer et al; and U.S. Pat. No. 3,324,888, granted June 13, 1967, to R. J. Henderson.

The valve disclosed by U.S. Pat. No. 2, 394,487 is really two valves in one. The upper end of the valve (as shown in the patent drawings) is similar in its basic structure to the preferred embodiment of the present invention. However, the spring means for biasing the slide bar into an intermediate position is entirely absent. The patent does disclose a detent between the body and the slide bar for determining a neutral position.

The valve disclosed by U.S. Pat. No. 3,324,888 is similar in its basic structure to both the aforementioned valve of U.S. Pat. No. 2,394,487 and the valve of the present invention. Again, the spring means for biasing the slide bar is entirely absent. Detent means are provided in the two end positions but are absent in the intermediate position.

The principal object of the present invention is to provide an improved multi-position valve which has a slide bar biased by spring means into an intermediate position.

U.S. Pat. No. 3,070,960 discloses a synchronized hydraulic remote control system that includes a valve slide member with two free ends which are provided with centering springs for normally retaining the slide member in its central position.

The above described patents, together with the prior art that was cited and considered by the Patent Office before granting them, as listed on such patents, should be carefully considered for the purpose of properly evaluating the subject invention and putting it into proper perspective relative to the prior art.

DISCLOSURE OF THE INVENTION

This invention relates to a novel multi-position valve. In its basic form, according to an aspect of this invention, the valve includes a housing that defines a slide chamber. A reciprocal slide bar is slidingly received within the chamber and reciprocates between at least three positions. Means are provided for biasing the slide bar into an intermediate position. These means include at least one recess, having end walls, in the housing; at least one cavity, having end walls, in the slide bar; and spring means disposed partially within the slide bar cavity and partially within the housing recess. The recess, cavity, and spring means are dimensioned such that, when the slide bar is moved in either direction away from such intermediate position, the spring means is compressed between an end wall of the cavity and an end wall of the recess, storing energy in it for urging the slide bar back into such intermediate position.

According to another aspect of the invention, the means for biasing the slide bar into an intermediate position include an essentially rectangular opening extending through the slide bar. The spring means is positioned within the opening with opposite side portions projecting outwardly beyond opposite side surfaces of the slide bar into two recesses in the housing, one recess being on each side of the slide bar.

According to another aspect of the invention, the housing comprises two members which are secured together and cooperate to form the slide chamber. One of the recesses that is part of the biasing means is formed in one such housing member, and the other recess is formed in the other housing member.

According to yet another aspect of the invention, the valve has a shaft which is removably attached to the slide bar for reciprocation. The attachment is accomplished by universal joint means to isolate the slide bar from any torque or transverse force and to allow angular play in the relative movements of the shaft and the slide bar.

The primary object of this invention is to provide a multi-position valve that can be operated manually with ease and that returns to an intermediate closed position when the manual operation ceases.

Another object of this invention is to provide a valve that is suitable for inflatable truck cab seats and that is particularly safe for such use since the chances of accidental overinflation or underinflation are minimized.

Two other related objects of this invention are to provide in a multi-position valve a simple mechanism for biasing the valve in an intermediate position and to provide a valve that is inexpensive to manufacture and easy to assemble.

The last mentioned object is a purpose of still another aspect of this invention. According to this other aspect, the reciprocating shaft has a head and a neck at one end identical in shape to a head portion and a neck portion at the other end. The symmetry of the two ends simplifies the manufacturing process and permits either end to be attached to the slide bar.

These and other objects, advantages and features will become apparent from the detailed description of the preferred embodiment that follows.

BRIEF DESCRIPTION OF THE DRAWINGS

In the drawings, like element designations refer to like parts throughout, and:

FIG. 1 is a pictorial view of a preferred embodiment of the invention.

FIG. 2 is a longitudinal sectional view of the preferred embodiment showing the valve in its intermediate position, the section being taken in a vertical plane bisecting the valve.

FIG. 3 is a fragmentary sectional view taken along the line 3—3 of FIG. 2, providing a top plan view of the slide bar and a portion of the reciprocating shaft and showing the angular play in the relative movements of the slide bar and shaft.

FIG. 6 is an exploded pictorial view of the preferred embodiment of the invention.

DESCRIPTION OF THE PREFERRED EMBODIMENT

Figure 4:
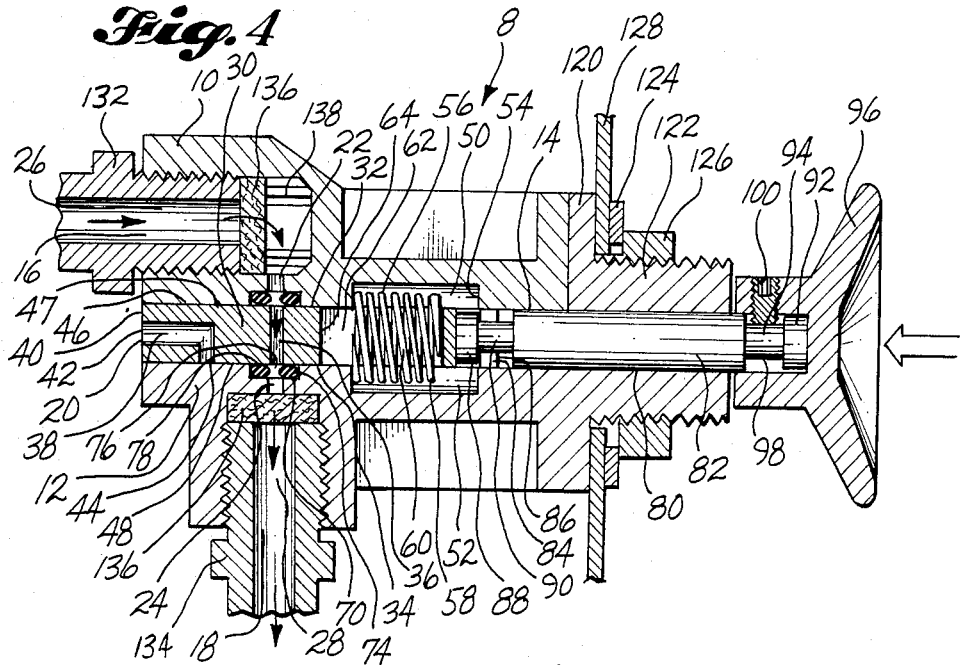
FIG. 4 is similar to FIG. 2 except that the valve is shown in its fully pushed in position.
Figure 5:
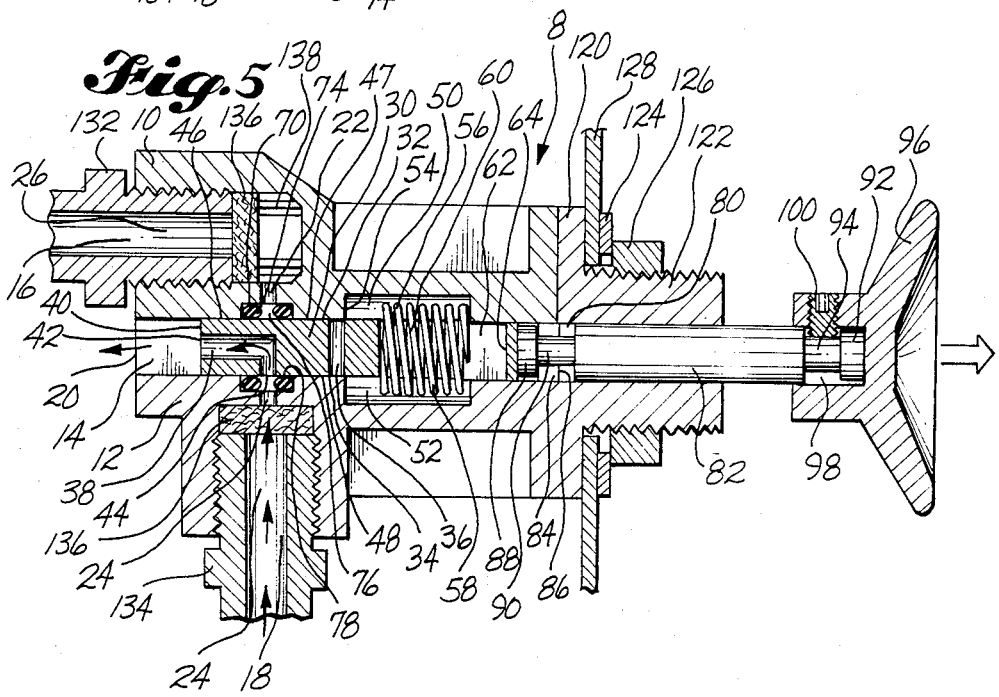
FIG. 5 is similar to FIG. 2 except that the valve is shown in its fully pulled out position.

The drawings show a valve 8 that is constructed according to the invention and that also constitutes the best mode of the invention currently known to the applicant. The valve 8 comprises a housing 10, 12 that has interior surfaces defining a slide chamber 14, which is most clearly visible in FIG. 6. A slide bar 30 is slidingly received within the slide chamber 14, in which it reciprocates longitudinally. The slide bar 30 has three positions, as shown in FIGS. 2, 4 and 5, which positions will be discussed further below.

The main novel feature of the invention and of its preferred embodiment is the inclusion of means for biasing the slide bar 30 in its intermediate position, shown in FIG. 2. The preferred embodiment of these biasing means includes two opposed recesses 50, 52 in the housing 10, 12 adjacent to the slide chamber 14; a rectangular opening 62 extending vertically through the slide bar 30; and a coil spring 60 positioned in the rectangular opening 62. All these components can be most clearly seen in FIG. 6.

Since the diameter of the spring 60 is larger than the vertical extension of the rectangular opening 62, in the assembled valve 8 the sides of the spring 56, 58 project from opposite side surfaces, in this embodiment the top surface 32 and bottom surface 34, of the slide bar 30 and extend into the opposed recesses 50, 52. In this embodiment, the size of the rectangular opening 62 is such that the spring 60 fits snugly into the opening 62 and must be slightly compressed in order to be placed in the opening 62. Additionally, the opposed recesses 50, 52 are located and are of such size and shape as to closely receive the projecting sides 56, 58 of the spring 60 when the slide bar 30 is in its intermediate position. As can be seen in FIG. 6, the recesses 50, 52 are concave with two vertical end walls 54 and have a uniform cross section in the shape of a segment of a circle. When the bar 30 is in its intermediate position, the ends of the spring 60 bear against the end walls 54 of the recesses 50, 52 and the end walls 64 of the rectangular opening 62 so that, when the slide bar 30 is reciprocated to the left or right, the spring 60 is compressed by the pressure of one end wall 54 of each recess 50, 52 and the opposing pressure of one end wall 64 of the opening 62. The spring 60 reacts in opposition to the compression, thereby urging the slide bar 30 back into its intermediate position.

The above features can be included in valves with virtually unlimited variations in other features and details of structure and function. The preferred variations, shown in the drawings, are as follows.

The housing 10, 12 of the valve 8 has two ports, an inlet port 16 and an outlet port 18. These ports 16, 18 have coaxial inner end portions 22, 24 on opposite sides of the slide chamber 14. In this embodiment, such opposite sides of the slide chamber 14 are adjacent to the top 32 and the bottom 34 surfaces of the slide bar 30.

Disregarding holes, all of the slide bar 30 surfaces, including the top and bottom 32, 34, are essentially flat and rectangular. The slide chamber 14 is similarly shaped to closely receive the slide bar 30 and has sufficient additional length to allow for the longitudinal reciprocation of the slide bar 30.

The slide bar 30 has two passageways 36, 38. The first of these 36 is formed by a vertical cylindrical bore and is positioned to be coaxial with the inner end portions 22, 24 of the inlet and outlet ports 16, 18 when the slide bar 30 is in its fully pushed in position, as shown in FIG. 4. The second passageway 38 is L-shaped, being formed by two perpendicularly intersecting cylindrical bores. This second passageway 38 has an outlet end 42, which is located at the left end 40 of the slide bar 30, and an inlet end 44, which is positioned to be aligned with the inner end portion 24 of the outlet port 18 when the slide bar 30 is in its fully pulled out position, as shown in FIG. 5. In addition, the slide bar 30 has a side wall closure portion 46 positioned to close the inner end portion 22 of the inlet port 16 when the slide bar 30 is in its fully pulled out position, and opposed side wall closure portions 47, 48 positioned to close the inner end portions 22, 24 of both ports 16, 18 when the slide bar 30 is in its intermediate closed position.

As is very clearly shown in FIG. 6, the housing 10, 12 is comprised of two members 10, 12 which, in the assembled valve 8, are secured together and cooperate to form the slide chamber 14. The members 10, 12 are secured together by means of two screws 140, which fit into vertical holes 144 in projections 142 in the housing 10, 12, there being one such projection 142 on each side of each member of the housing 10, 12. The left end 20 of the slide chamber 14 formed by the two housing members 10, 12 is open. The left end 40 of the slide bar 30 is adjacent to the open end 20 of the slide chamber 14 thereby venting the outlet end 42 of the second passageway 38 to the atmosphere.

In the preferred embodiment shown in the drawings, the inlet port 16 is formed in the upper housing member 10 adjacent to the open end 20 of the slide chamber 14, and such port includes an outer end portion 26 which is perpendicular to its inner end portion 22. The outlet port 18 is formed in the lower housing member 12 and includes an outer end portion 28 which is coaxial with its inner end portion 24.

The inlet port 16 may be connected to a source of compressed air or some other fluid by means of a fitting 132, a portion of which is shown in FIGS. 2, 4 and 5, at the end of a conduit. The inner surface of the outer end portion 26 of the inlet port 16 is threaded to mesh with threads on the end of the fitting 132. Similarly, the outlet port 18 may be connected to the receptacle into which the fluid is to be introduced by means of a fitting 134, a portion of which is shown in FIGS. 2, 4 and 5, at the end of a conduit. The inner surface of the outer end portion 28 of the outlet port 18 is threaded to mesh with threads on the end of the fitting 134. Filters 136 may be provided between the inner end portions 22, 24 and the outer end portions 26, 28 of the inlet 16 and outlet 18 ports. The inner surface of the outer end portion 26 of the inlet port 16 has ridges 138 extending outwardly from its inner blind end past its inner end portion 22. The filter 136 rests against the outer ends of these ridges 138 so that any fluid flowing into the inlet port 16 must pass through the filter 136 before it can enter the inner end portion 22.

When the valve 8 is so connected, the slide bar 30 has a closed, an operational, and an exhaust position. When the slide bar 30 is in its intermediate closed position, as in FIG. 2, there is no flow of the fluid. When the slide bar 30 is in its fully pushed in, or operational, position, as in FIG. 4, the fluid freely moves from its source to the receptacle, passing consecutively through the outer end portion 26 of the inlet port 16, the inlet filter 136, the inner end portion 22 of the inlet port 16, the first through passageway 36 in the slide bar 30, the inner end portion 24 of the outlet port 18, the outlet filter 136, and the outer end portion 28 of the outlet port 18. When the slide bar 30 is in its fully pulled out, or exhaust, position, as in FIG. 5, the fluid freely moves from the receptacle to the atmosphere, passing consecutively through the outer end portion 28 of the outlet port 18, the outlet filter 136, the inner end portion 24 of the outlet port 18, the second through passageway 38 in the slide bar 30, the slide chamber 14, and the open end 20 of the slide chamber 14.

In order to prevent leakage in the valve 8, a sealing arrangement is provided around the inner end portions 22, 24 of the inlet 16 and outlet 18 ports. This arrangement includes an annular seal socket 70 in the housing 10, 12 surrounding each of the inner end portions 22, 24. An elastomeric O-ring seal 74 is snugly received in each seal socket 70. Each such O-ring seal 74 has a center opening 76, which is aligned with the inner end portion 22, 24 of its respective port, and a side face portion 78, which makes sliding sealing contact with a side surface, in the preferred embodiment the top 32 or bottom 34 surface, of the slide bar 30.

If for any reason one or both of the seals 74 should fail and leakage should occur, the construction of the slide chamber 14 and the slide bar 30 would direct the leakage to the atmosphere through the open end 20 of the slide chamber 14. Therefore, potentially dangerous leakage of the fluid from its source into the receptacle is prevented, and the fluid cannot pass from its source into the receptacle unless the slide bar 30 is in its operational position. This safety feature is common to all multi-position valves with similarly constructed slide bars. The present invention adds the safeguard of biasing the slide bar 30 in its intermediate closed position, as is discussed at length above. The biasing automatically returns the slide bar 30 from its operational to its closed position, thereby dispensing with the need for the operator to shut off the valve and precluding the accidental introduction of excessive fluid into the receptacle resulting from the operator's failure to shut off the valve.

Referring to the drawings, it is apparent that the slide bar 30 is confined in the slide chamber 14. In order to allow manual operation of the valve, it is necessary to provide means for reciprocating the slide bar 30 in the slide chamber 14. In the preferred embodiment, these means include a shaft 82 removably attached to the right end of the slide bar 30 and extending out of the housing 12 through a hole 80 which extends longitudinally through the end of the housing 12 opposite the open end 20 of the slide chamber 14 and communicates with the slide chamber 14 opposite the open end 20. The two-part construction of the slide bar 30 and the shaft 82 has several advantages, which are discussed below.

The removable attachment of the shaft 82 to the slide bar 30 is accomplished by universal joint means in order to isolate the slide bar 30 from any torque or transverse force exerted by or on the shaft 82 and to allow angular play in the relative movements of the shaft 82 and the slide bar 30. The universal joint means comprises the mating of a T-shaped slot 84 in the bar 30 and head 88 and neck 90 portions of the shaft 82. The slot 84 extends through the bar 30 between opposite side surfaces, the top 32 and bottom 34 surfaces in this embodiment, and has an entrance 86 at the right end of the bar 30. The head portion 88 is formed at one end of the shaft 82, and the neck portion 90 is formed by a circumferential groove contiguous to the head portion 88. The head 88 and neck 90 portions are loosely received into the T-shaped slot 84 in the slide bar 30 and easily slip in and out of position during assembly or disassembly of valve 8.

In order to simplify manufacture and make it possible to attach either end of the shaft 82 to the slide bar 30, the two ends of the shaft 82 are symmetrical. The shaft 82 has, at its end opposite the end with the above described head 88 and neck 90 portions, a head 92 and a neck 94 contiguous to the head 92. The head 92 and neck 94 are identical in shape to the opposite head portion 88 and neck portion 90, respectively.

For manual operation of the valve 8, a knob 96 is attached to the end of the shaft 82 extending out of the housing 12. The knob 96 has a passage 98 into which the head 92 and neck 94 are received. Fastening means are provided for attaching the shaft 82 to the knob 96. The drawings show the preferred fastening means, which consist of a set screw 100 threaded through the knob 96 and engaging the neck 94 of the shaft 82.

The actual operation of the valve 8 is quite simple. When no external force is acting on the reciprocating means, the coil spring 60 maintains the slide bar 30 in its intermediate position. The knob 96 may be manually pushed in to move the slide bar 30 into its operational position (FIG. 4) or pulled out to move the slide bar 30 into its exhaust position (FIG. 5). The end of the housing 12 through which the shaft 82 extends provides a stop preventing the slide bar 30 from being pulled beyond its exhaust position, and the knob 96 provides a stop preventing the bar 30 from being pushed beyond its operational position.

The two-part construction of the slide bar 30 and the shaft 82 isolates the slide bar 30 from any forces exerted by or on the shaft 82 except the desired longitudinal force that reciprocates the slide bar 30. This allows the slide bar 30 to float freely between its three positions uninfluenced by such forces. As a result, the slide bar 30 is automatically centered between the two O-ring seals 74, and the pressures on the top 32 and bottom 34 surfaces of the bar 30 are substantially balanced. This balancing is not disturbed by the spring biasing because there is a single coil spring 60 which is carried by and tightly mounted in the slide bar 30, and therefore, no unbalanced transverse forces are exerted on the bar 30.

Many multi-position valves have one-part slide members that function as both a gate (the slide bar 30 in valve 8) and a reciprocating shaft. Such valves operate less smoothly and efficiently than valve 8 of the present invention because the gate is affected by any and all forces that are exerted on the shaft. The non-longitudinal forces interfere with the centering of the gate and, thus, have a restraining effect on its longitudinal movement. In addition, these valves are very susceptible to damage caused by torques and transverse forces applied to the shaft.

Valves with one-part slide members present an additional problem when the shaft extends through a guide passageway (hole 80 in valve 8) in a closed end of the valve housing. It is very difficult to construct the valve without some degree of misalignment between the guide passageway and the slide chamber. In order to overcome the difficulty, precision machining is necessary, significantly increasing the cost of manufacture. The two-part construction of the preferred embodiment of the present invention, including the loose fit of the shaft 82 in the T-shaped slot 84, allows deviations in the relative movements of the slide bar 30 and the shaft 82 and makes up for any misalignment between the hole 80 and the slide chamber 14. Therefore, precision machining is unnecessary, and the cost of manufacture is reduced.

The two-part construction of valve 8 also reduces the cost of manufacture in another way. It permits the slide bar 30 to be cast from a zinc material, and zinc die casting is a relatively inexpensive way of making a slide bar. Zinc is not suitable for one-part slide members since it is not strong enough to carry the forces that could be applied to it if it were used to make such a member.

The valve 8 may be easily installed in a variety of environments by attaching it to a thin flat mounting surface 128, a portion of which is shown in FIGS. 2, 4 and 5. For mounting, the lower housing member 12 is provided with a circular flange 120, which also serves as the end of the housing 10, 12 opposite the open end 20 of the slide chamber 14, and a threaded neck 122 projecting from the flange 120. Installation is accomplished by inserting the threaded neck 122 into a suitable hole in the mounting surface 128 and securing the mounting surface 128 against the flange 120 by means of a lock washer 124 and nut 126.

When the valve 8 is to be used in one of its most advantageous applications, regulating the flow of compressed air into and out of an inflatable truck cab seat, the mounting surface 128 is a portion of the seat structure of the truck within easy reach of the driver.

The construction of the housing 10, 12, the reciprocating means, the biasing means, and other features of the valve 8 make assembly particularly easy and inexpensive. One additional feature of the valve 8 not yet described also makes assembly foolproof. The lower housing member 12 includes a ridge 112 on a wall portion of the slide chamber 14 adjacent to the bottom surface 34 of the slide bar 30. The bottom surface 34 of the bar 30 has a complementary groove 114 which slidably receives the ridge 112. Hence, the bar 30 will fit into the housing 10, 12 in one direction only, and faulty assembly is virtually impossible.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

We claim:

1. A valve of a type having a housing which defines a slide chamber and includes first and second ports having coaxial inner end portions on opposite sides of the slide chamber; a reciprocal slide bar slidingly received within the slide chamber, which slide bar reciprocates between a first end position, a second end position, and an intermediate position and includes a passageway that communicates said ports when the slide bar is in its first end position, and closure portions that block communication between said ports when the slide bar is in its second end position or its intermediate position; and a sealing member surrounding the inner end portion of each port and including a portion which makes sliding, sealing contact with a surface of the slide bar; said housing being formed of two parts adjacent to opposite faces of the slide bar, and said housing parts having elongated mating surfaces and cooperating to form the slide chamber; with an improvement comprising:

means for biasing the slide bar into the intermediate position including two recesses in the housing, one on each side of the slide bar, having end walls; an essentially rectangular opening extending through the slide bar and having end walls; and a coil spring positioned within the opening, with opposite side portions thereof projecting outwardly beyond opposite side surfaces of the slide bar and into said recesses; the recesses, opening, and coil spring being dimensioned such that, when the slide bar is moved from the intermediate position into either the first end position or the second end position, the coil spring is compressed between an end wall of the opening and an end wall of each recess, storing energy in it for urging the slide bar back into the intermediate position; and means for reciprocating the slide bar including a hole extending through the housing and communicating with the slide chamber adjacent one end of the slide bar, and a shaft removably attached to said one end of the slide bar and extending out of the housing through the hole, said shaft being so attached by universal joint means to isolate the slide bar from any torque or transverse force and to allow angular play in the relative movements of the shaft and the slide bar;

said recesses in the housing being located between said ports and said hole.

2. A valve as recited in claim 1 wherein:

the slide bar has a T-shaped slot extending therethrough between opposite side surfaces, said slot having an entrance at said one end of the slide bar; and the shaft includes a head portion at one end, and a circumferential groove forming a neck portion contiguous to the head portion, said head portion and neck portion being loosely received into the T-shaped slot in the slide bar.

3. A valve as described in claim 2:

wherein the shaft includes a head at its end opposite said one end, and a neck contiguous to the head, said head and neck being identical in shape to said head portion and neck portion, respectively; and further comprising a knob having a passage into which the head and neck are received, and fastening means for attaching the shaft to the knob, which fastening means engages said neck.

4. In a valve mechanism, a valve housing having a slide valve chamber and an adjoining spring chamber of larger cross section than the slide valve chamber providing a shoulder at the junction of the spring chamber with the slide valve chamber, slide valve means movably mounted in the slide valve chamber and having a rectangular portion adjacent to the spring chamber, said valve housing being formed of two parts adjacent to opposite faces of the slide valve means, said housing parts having elongated mating surfaces and cooperating to form the slide valve chamber, said valve housing being formed with at least one valve port controlled by the slide valve means, said valve housing also being formed with an opening at one end leading from the slide valve chamber to the outside of the housing, and the slide valve means including operating means passing through said opening for operating the slide valve means from outside the housing, spring means in the spring chamber arranged to engage the rectangular portion of the slide valve means and said shoulder, said spring means urging the slide valve means in a predetermined direction and being stopped by the shoulder, said spring chamber being located in the housing between the valve port and the opening for the operating means.

5. The combination recited in claim 4 in which the slide valve means comprises a slide bar that is slidingly received within the slide valve chamber, and the operating means comprises a shaft removably attached to one end of the slide bar by universal joint means to isolate the slide bar from any torque or transverse force and to allow angular play in the relative movements of the shaft and the slide bar.

6. The combination recited in claim 5 in which:
the slide bar has a T-shaped slot extending therethrough between opposite side surfaces, said slot having an entrance at said one end of the slide bar; and
the shaft includes a head portion at one end, and a circumferential groove forming a neck portion contiguous to the head portion, said head portion and neck portion being loosely received into the T-shaped slot in the slide bar.

7. The combination recited in claim 6:
wherein the shaft includes a head at its end opposite said one end, and a neck contiguous to the head, said head and neck being identical in shape to said head portion and neck portion, respectively; and
further comprising a knob having a passage into which the head and neck are received, and fastening means for attaching the shaft to the knob, which fastening means engages said neck.

8. The combination recited in claim 4 in which the slide valve means comprises a slide bar that is slidingly received within the slide valve chamber, and the operating means comprises a shaft removably attached to one end of the slide bar by attaching means that includes slip means for allowing the slide bar to be attached to the shaft by dropping the slide bar transversely onto the shaft.

9. The combination recited in claim 4, in which one of said housing parts includes an integral end wall through which the opening for the operating means extends, and the other of said housing parts includes an end surface that abuts against an end surface of said end wall.

10. The combination recited in claim 9, in which said other of said housing parts has coplanar surface portions forming one wall of the slide chamber and said elongated mating surfaces.

11. In a valve mechanism, a valve housing having a slide valve chamber and an adjoining spring chamber of larger cross section than the slide valve chamber providing a shoulder at the junction of the spring chamber with the slide valve chamber, slide valve means movably mounted in the slide valve chamber and having a rectangular portion adjacent to the spring chamber, said valve housing being formed of two parts adjacent to opposite faces of the slide valve means, said housing parts having elongated mating surfaces and cooperating to form the slide valve chamber, said valve housing being formed with at least one valve port controlled by the slide valve means, said valve housing also being formed with an opening at one end leading from the slide valve chamber to the outside of the housing, and the slide valve means including operating means passing through said opening for operating the slide valve means from outside the housing, spring means in the spring chamber arranged to engage the rectangular portion of the slide valve means and said shoulder, said spring means urging the slide valve means in a predetermined direction and being stopped by the shoulder, said spring chamber being located in the housing between the valve port and the opening for the operating means;
wherein the slide valve means comprises a slide bar that is slidingly received within the slide valve chamber, and the operating means comprises a shaft removably attached to one end of the side bar by attaching means that includes slip means for allowing the slide bar to be attached to the shaft by dropping the slide bar transversely onto the shaft; and
wherein one of said housing parts includes an integral end wall through which said opening for the operating means extends, the other of said housing parts includes an end surface that abuts against an end surface of said end wall, and the attaching means is positioned in the slide valve chamber adjacent to said end wall.

12. The combination recited in claim 11, in which said other of said housing parts has coplanar surface portions forming one wall of the slide valve chamber and said elongated mating surfaces.

13. A valve of a type having a housing which defines a slide chamber and includes first and second ports having coaxial inner end portions on opposite sides of the slide chamber; a reciprocal slide bar slidingly received within the slide chamber, which slide bar reciprocates between a first end position, a second end position, and an intermediate position and includes a passageway that communicates said ports when the slide bar is in its first end position, and closure portions that block communication between said ports when the slide bar is in its second end position or its intermediate position; and a sealing member surrounding the inner end portion of each port and including a portion which makes sliding, sealing contact with a surface of the slide bar; with an improvement comprising:
means for biasing the slide bar into the intermediate position including two recesses in the housing, one on each side of the slide bar, having end walls; an essentially rectangular opening extending through the slide bar and having end walls; and a coil spring positioned within the opening, with opposite side portions thereof projecting outwardly beyond opposite side surfaces of the slide bar and into said recesses; the recesses, opening, and coil spring being dimensioned such that, when the slide bar is moved from the intermediate position into either the first end position or the second end position, the coil spring is compressed between an end wall of the opening and an end wall of each recess, storing energy in it for urging the slide bar back into the intermediate position; and
means for reciprocating the slide bar including a hole extending through the housing and communicating with the slide chamber adjacent one end of the slide bar, and a shaft removably attached to said one end of the slide bar and extending out of the housing through the hole, said shaft being so attached by universal joint means to isolate the slide bar from any torque or transverse force and to allow angular play in the relative movements of the shaft and the slide bar;
wherein the housing comprises two members that are adjacent to opposite sides of the slide bar and cooperate to form the slide chamber, one of said housing members including an integral end wall through which the hole for the shaft extends, and the other of said housing members including an end surface that abuts against an end surface of said end wall of said one housing member.

14. A valve as recited in claim 13, in which the universal joint means allows the slide bar to be attached to the shaft by dropping the slide bar transversely onto the shaft, and includes a joint component at the inboard end of the shaft which is positioned in the slide chamber adjacent to the housing end wall.

15. A valve as recited in claim 14, in which said housing members have elongated mating surfaces, and said other of said housing members has coplanar surface portions forming one wall of the slide chamber and said elongated mating surfaces.

16. A valve as described in claim 15, in which the housing comprises two members which are secured together and cooperate to form the slide chamber, one such housing member includes a ridge on a wall portion of the slide chamber, and one surface of the slide bar includes a complementary groove slidably receiving said ridge.

17. A valve as recited in claim 14, in which one of said ports has an outer end portion at the end of the housing opposite said housing end wall with its longitudinal axis parallel to the direction of reciprocation of the slide bar, and the other of said ports has an outer end portion on one side of the housing with its longitudinal axis essentially perpendicular to said direction.

18. In a valve mechanism, a valve housing having a slide valve chamber and an adjoining spring chamber of larger cross section than the slide valve chamber providing a shoulder at the junction of the spring chamber with the slide valve chamber, slide valve means movably mounted in the slide valve chamber and having an end portion adjacent to the spring chamber, said valve housing being formed of two parts adjacent to opposite faces of the slide valve means, said housing parts having elongated mating surfaces and cooperating to form the slide valve chamber, said valve housing being formed with at least one valve port controlled by the slide valve means, said valve housing also being formed with an opening at one end leading from the slide valve chamber to the outside of the housing, and the slide valve means including operating means passing through said opening for operating the slide valve means from outside the housing, spring means in the spring chamber arranged to engage said end portion of the slide valve means and said shoulder, said spring means urging the slide valve means in a predetermined direction and being stopped by the shoulder;

wherein one of said housing parts includes an integral end wall through which said opening for the operating means extends, the other of said housing parts includes an end surfact that abuts against an end surface of said end wall, the slide valve means comprises a slide bar that is slidingly received within the slide valve chamber, the operating means comprises a shaft removably attached to one end of the slide bar by attaching means that includes slip means for allowing the slide bar to be attached to the shaft by dropping the slide bar transversely onto the shaft, said attaching means being positioned inwardly of said end wall, and said other of said housing parts has coplanar surface portions forming one wall of the slide valve chamber and said elongated mating surfaces.

19. The combination recited in claim 18, in which the attaching means comprises a T-shaped slot extending through the slide bar between opposite side surfaces of the slide bar, said slot having an entrance at said one end of the slide bar, a head portion at one end of the shaft, and a circumferential groove forming a neck portion contiguous to the head portion, said head portion and neck portion being loosely received into the T-shaped slot in the slide bar; and in which the shaft includes a head at its end opposite said one end, and a neck contiguous to the head, said head and neck being essentially identical in shape to said head portion and neck portion, respectively; and in which said operating means further comprises a knob having a passage into which the head and neck are received, and fastening means for attaching the shaft to the knob, which fastening means engages said neck.

20. In a valve mechanism, a valve housing having a slide valve chamber and an adjoining spring chamber of larger cross section than the slide valve chamber providing a shoulder at the junction of the spring chamber with the slide valve chamber, slide valve means movably mounted in the slide valve chamber and having an end portion adjacent to the spring chamber, said valve housing being formed of two parts adjacent to opposite faces of the slide valve means, said housing parts having elongated mating surfaces and cooperating to form the slide valve chamber, said valve housing being formed with at least one valve port controlled by the slide valve means, said valve housing also being formed with an opening at one end leading from the slide valve chamber to the outside of the housing, and the slide valve means including operating means passing through said opening for operating the slide valve means from outside the housing, spring means in the spring chamber arranged to engage said end portion of the slide valve means and said shoulder, said spring means urging the slide valve means in a predetermined direction and being stopped by the shoulder;

wherein one of said housing parts includes an integral end wall through which said opening for the operating means extends, the other of said housing parts includes an end surface that abuts against an end surface of said end wall, the slide valve means comprises a slide bar that is slidingly received within the slide valve chamber, and the operating means comprises a shaft removably attached to one end of the slide bar by attaching means.

21. The combination recited in claim 20, in which the attaching means allows the slide bar to be attached to the shaft by dropping the slide bar transversely onto the shaft, and includes a joint component at the inboard end of the shaft which is positioned in the slide valve chamber adjacent to the housing end wall.

22. The combination recited in claim 20, in which said other of said housing parts has coplanar surface portions forming one wall of the slide chamber and said elongated mating surfaces.

* * * * *

UNITED STATES PATENT AND TRADEMARK OFFICE
CERTIFICATE OF CORRECTION

PATENT NO. : 4,524,951

DATED : June 25, 1985

INVENTOR(S) : Charles J. Green and Alan K. Forsythe

It is certified that error appears in the above-identified patent and that said Letters Patent are hereby corrected as shown below:

Column 10, line 7, "side" should be -- slide --.

Column 11, line 54, "surfact" should be -- surface --.

Signed and Sealed this

Fifteenth Day of July 1986

[SEAL]

*Attest:*

DONALD J. QUIGG

*Attesting Officer*

*Commissioner of Patents and Trademarks*